United States Patent
Granberry

[15] 3,657,779
[45] Apr. 25, 1972

[54] IDLER ASSEMBLY FOR CONVEYOR BELTS

[72] Inventor: Roger A. Granberry, 5757 North Elston Avenue, Chicago, Ill. 60646

[22] Filed: Oct. 30, 1970

[21] Appl. No.: 85,535

[52] U.S. Cl. ...........................................................29/124
[51] Int. Cl. ....................................................B21b 31/08
[58] Field of Search...........................29/124, 129.5, 121 A

[56] References Cited

UNITED STATES PATENTS

| 665,806 | 1/1901 | Smith | 29/121 R |
| 2,754,849 | 7/1956 | Wirth | 29/124 X |
| 2,977,725 | 4/1961 | Simendinger | 29/121 R |

FOREIGN PATENTS OR APPLICATIONS

| 312,328 | 12/1955 | Switzerland | 29/124 |

Primary Examiner—Alfred R. Guest
Attorney—Hill, Sherman, Meroni, Gross & Simpson

[57] ABSTRACT

A quick-change idler roller comprising a roller structure in the form of two longitudinally extending mating halves adapted to be clamped upon a supporting shaft by clamping straps or the like in which the two halves are so constructed that upon mounting on the supporting shaft that the outer peripheral portions of the halves will be subjected at their junctures to greater circumferential compression forces than the inner peripheral portions thereat.

8 Claims, 7 Drawing Figures

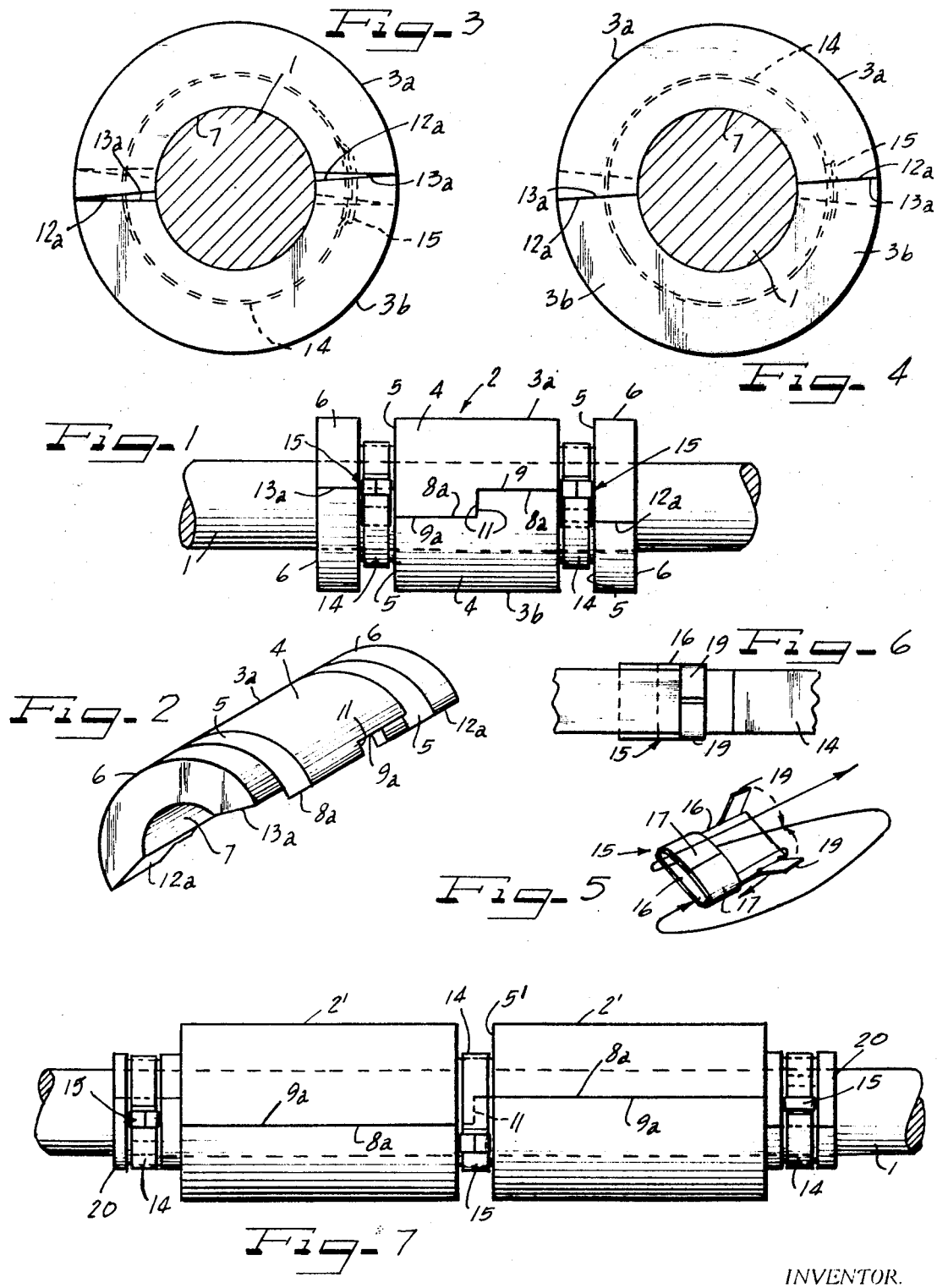

IDLER ASSEMBLY FOR CONVEYOR BELTS

BACKGROUND OF THE INVENTION

In the past idler rollers, for example, for heavy duty belt conveyor structures and the like have employed a series of relatively flat disks of various types of material, one common material utilized quite extensively, being rubber encased cord plies, such as found in automobile tire carcasses or the like and in many instances salvage tire carcasses were used as the stock from which the disks were cut. Such disks, commonly having a thickness of from about three-eighths of an inch to one-half inch and a diameter equal to that of the roller assembly in which it is to employed, as for example 6 to 8 inches or more, were each provided with a central bore of a size to receive the supporting shaft therefor with a press fit, i.e., the disks were forced on the shaft and thus firmly frictionally engaged therewith. Collars or other suitable means were oftentimes provided to suitably retain the disks in operative axial position on the shaft.

More recently rollers have been fabricated utilizing a plurality of such disks and following axial assembly on a mandrel or the like were provided with a common continuous coating of a suitable material such as high durometer polyeurethane to produce a roller having a very long wearing outer peripheral surface, thereby materially increasing the life of the roller structure.

Idler rollers of this general type, used for replacement purposes, required a dismantling of the equipment on which it was to be assembled as it was necessary to remove the supporting shaft from such equipment to enable reception of the new roller or rollers thereon, resulting in relatively long "down" periods of the equipment.

While there has been some activity with respect to the utilization of idler rollers divided longitudinally into two halves which could be secured to the supporting shaft therefor without the necessity of tearing down the equipment, such rollers have not proved practical and consequently have not been extensively employed. It will be appreciated that where two longitudinal halves must be assembled, some form of clamping means is necessary and as the roller structure is normally composed of a material that is at least semi-resilient, as for example hard rubber compounds, high durometer polyeurethane and the like, usually reinforced by suitable cord material, etc., efficient clamping on the shaft should not be obtained, particularly as to achieving a substantially equal take-up of the clamping means whereby resonably uniform clamping action was achieved throughout the assembly. This undesirable action results from the difficulty created by the extreme friction factors generated by the mounting devices at the time of assembly as the two halves of the assembly were, in this case, capable of very little movement or give as they are compressed on the shaft.

The present invention therefore has as its object the production of an idler roller which is longitudinally split, enabling its mounting on the desired supporting shaft without dismantling of the equipment, it being unnecessary to expose either end of the supporting shaft, and in which the assembled roller has the desired characteristics which will enable satisfactory mounting as well as long wear life.

BRIEF SUMMARY OF THE INVENTION

The present invention accomplishes the desired results by the utilization of an idler roller assembly which is divided into two longitudinal halves whereby each half may be disposed about the intermediate portion of a supporting shaft and secured thereto by suitable means such as band clamps. The opposed longitudinally extending mating edges of the two halves are so proportioned and are provided with such configuration that they do not initially extend in parallel or abutting relation when positioned on the receiving shaft, prior to the application of clamping forces thereon. Instead, such opposing edges diverge from the outer periphery of the roller to initially leave a slight gap between such edges at the inner periphery of the roller. In other words the initial circumferential distance from one longitudinal edge to the other longitudinal edge of a roller half is somewhat greater than 180° of the outer roller circumference while the inner circumferential distance between such edges of that portion of the half forming the bore for the supporting shaft, is somewhat less than 180° of the shaft circumference.

The two halves are provided with a suitable configuration, for example, portions of reduced external diameter, to receive clamping bands and suitable locking means therefor whereby the two longitudinal halves may be suitably placed under compression.

With this construction, upon the application of compression forces through a clamping band or the like, engagement of the meeting edges of the two longitudinal halves of the roller assembly initially will take place adjacent the outer periphery of the roller assembly and as such clamping forces are increased the inner periphery of the roller halves is relatively free to "flow" along the periphery of the supporting shaft so that when the clamping forces reach their desired final value the edges of the two halves will abut throughout their area, and the compression of the material thereat will be greater adjacent the outer periphery of the roller than adjacent the periphery of the supporting shaft. The construction results in a very firmly supported roller having no pronounced enlargement or undesired joint between the two longitudinal halves and produces a roller assembly having a smooth, relatively dense peripheral structure which is very efficient for the intended use.

BRIEF DESCRIPTION OF THE DRAWINGS

In the drawings wherein like reference characters indicate like or corresponding parts:

FIG. 1 is a top plan view of a portion of a supporting shaft with an idler roller, constructed in accordance with the invention, operatively mounted thereon;

FIG. 2 is a perspective view of one of the roller halves illustrated in FIG. 1;

FIG. 3 is an end elevational view of a roller assembly, such as illustrated in FIG. 1, prior to its being clamped on the supporting shaft;

FIG. 4 is an end elevational view, similar to FIG. 3 following completion of the clamping of the two halves to the supporting shaft;

FIG. 5 is a perspective view of a known type of band fastening clamp which may be utilized with the invention;

FIG. 6 is a top plan view of two strap ends secured by means of a clip such as illustrated in FIG. 5; and FIG. 7 is a top plan view similar to FIG. 1 illustrating a further embodiment of the invention.

DETAILED DESCRIPTION OF THE INVENTION

Referring to the drawings, and more particularly to FIGS. 1 and 2, the reference numeral 1 indicates a supporting shaft on which is mounted an idler roller, indicated generally by the numeral 2, comprising a pair of roller halves 3a and 3b which may be of identical construction and so proportioned that upon suitable disposition of reversal the two halves will mate as clearly illustrated in FIG. 1.

In the embodiment of the invention illustrated in FIG. 1 such a roller half comprises a central portion 4 having an outer diameter defining the outer diameter of the assembled roller and disposed at each side of the central portion 4 but spaced therefrom by a groove 5 is an end portion 6 of the same outer diameter as the portion 4.

The half 3 is provided with a semi-circular inner surface 7, extending continuously from one end of the half to the other and having a radius of curvature approximately equal to that of the shaft 1. As clearly illustrated in FIG. 1, the longitudinal dividing line between the two halves preferably is not in the form of a continuous straight edge but rather is of staggered or toothed configuration with the longitudinal edges of the central portion 3 being divided into two sections 8 and 9 offset from one another with the edges 8a, 9a or the opposite edges 8b, 9b connected by respective radially edges 11. In like manner, the right hand end portion 6 has an edge 12a extending substantially in the same plane as the edge 8a and in like manner the left hand end portion 6 has an edge 13a extending substantially in the same plane as the edge 9a. As will be apparent from a reference to FIGS. 1 and 2, the edge 12a also defines the end edge of the bottom wall material of the adjacent groove 5 and in like manner the edge 13a defines the edge of the bottom wall of the adjacent groove 5. As will be apparent from the reference to FIG. 2, the opposite longitudinal edges not visible in FIG. 1 are constructed identical with those heretofore described, with the exception that their positions are reversed, to that illustrated in FIG. 1.

Referring to FIGS. 1, 5 and 6, the two halves 3a and 3b are adapted to be secured in operative relation on the shaft by means of a plurality of straps 14 the free ends of which are adapted to be connected by respective clips, indicated generally by the numeral 15, the strapping 14 and clips 15 being of generally standard construction and commercially procurable. Referring to FIG. 5, the clip therein illustrated is formed from sheet steel and comprises a base of body portion 16 having a pair of strips 17 adjacent one end of the body portion 16, which are bent to bring their free ends in abutting relation, forming a channel 18 for the reception of the strapping 14. Also carried by the base portion 16 adjacent the opposite end thereof are a pair of ears 19 initially disposed in more or less parallel relation as illustrated.

As diagrammatically represented by the broken line, the strapping is adapted to be initially disposed with one end thereof inserted into the channel 18 with the free end bent downwardly around the edge of the base portion 16 adjacent the ears 19 and the extreme free end lying below the base portion. The strapping is then wrapped around the object, in this case the two roller halves, and the free end passed between the ears 19 and inserted in the channel 17. The extreme free end extending from the end of the clip adjacent the portions 17, after tensioning of the strap, is bent sharply around the portion 17 with the adjacent end of the strap between the ears 19, which are bent inwardly toward one another and downwardly as illustrated in FIG. 6 to securely clamp the free end of the strap to the clip. Such tensioning of the strapping may be readily accomplished by means of known tools in which the free end of the strap, following its insertion through the channel 17, is engaged in the jaws of the tool with the latter bearing against the adjacent end of the seal and following tensioning the tool is then rotated upwardly and back toward the opposite end of the seal to bend the strap around the projections 17. Such initial bend in the strap will serve to retain the strap in tensioned condition, following which the free end may be readily urged down between the ears 19 into engagement with the adjacent portion of the strap and the ears 19 folded over in locking relation.

The illustrated type of clip is particularly suitable for the present application as the commercially available tensioning tools for use therewith have an effective width at the point of engagement with the strap to permit insertion of the end of the tool into the groove 5 and as no seal crimping is involved the groove 5 may be of a width merely sufficient to enable suitable disposition of the strap and seal therein. Obviously, if a crimped seal were employed the groove 5 would have to be of a greater width to enable the crimping tool to engage the sides of the seal.

Referring to FIGS. 2 and 3, it will be noted that the edges 12a, 12b, 13a and 13b as well as the edges 8a, 9a and 9b initially do not lie in a common plane, such edges extending in slightly inwardly diverging directions, with the inner periphery 7 having a circumferential dimention which is slightly less than half of the circumference of the shaft 1, and circumferential dimensions of the portions 3 and 6 of each half being slightly greater than half of the outer circumference of the roller. Thus, when the two halves are disposed in cooperable relation prior to clamping, as illustrated in FIG. 3, opposed edges of the two halves will not extend in parallel abutting relation but will be closely adjacent one another at the outer periphery of the roller and slightly spaced apart adjacent the shaft 1, i.e. opposing edge surfaces will diverge toward the shaft 1. Following application of each strap and seal, as tension is applied thereto during the mounting operation the roller material extending between the strap and the shaft will be compressed, causing the material to flow slightly along the surface of the shaft 1, such flow being accommodated in the initial gap between the opposing edges of the two roller halves. The structure is so proportioned that when the tensioning operation is completed the opposing edges of the two halves will be in contacting relation as illustrated in FIG. 4. At the same time the outer peripheral portions of the roller will be placed under some circumferential compression, resulting in a smooth and efficient mating of the longitudinally extending edges of the two halves without any bulging thereat and providing a very firm and durable abutting of the two halves, whereby there is no tendency for the meeting edges to work outwardly, fray or otherwise deteriorate in the operation of the structure.

It will be appreciated that the staggering of the longitudinal edges of the two halves not only insures accurate longitudinal alignment of the two halves but also prevents the conveyor belt from simultaneous engagement or disengagement from one roller half along the entire longitudinal length of the abutting edges thereof, thereby reducing any tendency for the belt to lift or separate the roller halves at their abutting edges.

In some cases it may be desirable to eliminate grooves adjacent each axial end of the roller and if the roller is of sufficient length to warrant it, to employ and additional intermediate strap between the ends of the roller. Such a construction is illustrated in FIG. 7 wherein the roller is of a length to permit the effective use of a centrally disposed strap 14 positioned in an intermediate groove 5' with the roller being provided with hub portions 20 at each end thereof reduced diameter as compared with the operating diameter of the portions 2', with each portion 20 having a strap 14 encircling the same and secured by a clip 15, the groove 5' having an inner diameter, about which the strap 14 extends, of the same diameter as the portions 20. This embodiment also illustrates a staggering of the abutting edges of the two halves with such edges being numbered to correspond to those of the construction illustrated in FIGS. 1 through 4, and in like manner such abutting edges would initially be inwardly divergent as illustrated in FIG. 3.

It will be appreciated from the above disclosure that the roller may be readily removed and replaced with a new illustrated roller without any dismantling whatsoever, as heretofore required with previous roller structures which must be inserted endwise on the shaft.

It will be appreciated that as the construction of FIG. 7 provides additional space adjacent the ends of the roller for access to the strap retaining seal, such construction readily adapts itself for use, is desired, with seals of other constructions than that illustrated in FIG. 5, the latter type of seal however preferably being employed at the central portion of the roller, whereby the axial width of the groove 5' may be at a minimum.

Having thus described my invention it will be obvious that various immaterial modifications may be made in the same without departing from the spirit of my invention; hence, I do not wish to be understood as limiting myself to the exact form and arrangement of parts illustrated and described.

I claim as my invention:

1. A quick-change idler roller assembly for mounting on a shaft for use with conveyor belts and the like, comprising a generally cylindrical idler roller sleeve in the form of two cooperable longitudinal halves of at least slightly resilient material, said halves being cooperable to form a central bore for the reception of a supporting shaft, to which said halves are to be rigidly clamped, and presenting a smooth, belt engageable surface of substantially uniform diamtr, the longitudinally extending mating faces of the respective halves having their oppositely disposed longitudinal faces extending angularly to one another in inwardly diverging directions when in abutting but an unclamped condition, and means for exerting clamping forces on said halves tending to bring said opposed longitudinal faces into engagement substantially throughout their opposed areas, said halves having axially aligned cooperable portions of a diameter less than a belt engageable portion thereof, said clamping means being disposable at and adapted to exert clamping forces on such portions of lesser diameter.

2. An idler assembly according to claim 1, wherein such a clamp-receiving portion is disposed adjacent each axial end of said assembly but spaced axially inward therefrom, with the respective portions disposed axially between a portion of lesser diameter and the adjacent end of the assembly having the same diameter as intermediate said clamp-receiving portions.

3. An idler assembly according to claim 1, wherein such a clamp-receiving portion is disposed at and defines the corresponding end of the assembly.

4. An idler assembly according to claim 1 wherein said assembly is provided with clamping means adjacent each end of the assembly, and there is provided intermediate said end clamping means, a portion of lesser diameter having further clamping means thereat.

5. An idler assembly according to claim 1, wherein each of the cooperable edges of the two roller halves have complementally peripherally offset sections whereby such cooperable edges are axially interlocking.

6. An idler assembly according to claim 5, wherein said halves are of identical configuration and thus greatly reversably complementary.

7. An idler assembly according to claim 1, wherein said clamping means comprises an elongated band and means for rigidly connecting the free ends of said band while the latter is under tension.

8. An idler assembly according to claim 7, wherein said connecting means comprises a clip member having transversely extending edge portions about which respective ends of the strapping are bent, said clip further having bendable projecting members adapted to be bent over the uppermost strap end to retain the same in engagement with said clip member.

* * * * *